US008380980B2

(12) United States Patent
Shon

(10) Patent No.: US 8,380,980 B2
(45) Date of Patent: Feb. 19, 2013

(54) SYSTEM AND METHOD FOR PROVIDING SECURITY IN MOBILE WIMAX NETWORK SYSTEM

(75) Inventor: Tae-Shik Shon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1491 days.

(21) Appl. No.: 11/984,654

(22) Filed: Nov. 20, 2007

(65) Prior Publication Data

US 2010/0049969 A1 Feb. 25, 2010

(30) Foreign Application Priority Data

Dec. 21, 2006 (KR) .................. 10-2006-0131971

(51) Int. Cl.
*H04L 29/06* (2006.01)
(52) U.S. Cl. ......... 713/156; 380/270; 380/282; 713/170
(58) Field of Classification Search .......... 713/156–159, 713/170, 176; 380/270, 282
See application file for complete search history.

(56) References Cited

U.S. PATENT DOCUMENTS

| 5,442,342 | A  | * | 8/1995 | Kung ......................... 340/5.27 |
| 6,912,656 | B1 | * | 6/2005 | Perlman et al. ............... 713/170 |
| 2005/0081039 | A1 | * | 4/2005 | Lee et al. ...................... 713/176 |

FOREIGN PATENT DOCUMENTS

| KR | 2005-0089736 | 9/2005 |
| KR | 2006-0097572 | 9/2006 |
| KR | 2006-0101234 | 9/2006 |
| WO | 2005-101787 | 10/2005 |

OTHER PUBLICATIONS

"IEEE Standard for Local and metropolitan area networks; Part 16: Air Interface for Fixed and Mobile Broadband Wireless Access Systems; Amendment 2: Physical and Medium Access Control Layers for Combined Fixed and Mobile Operation in Licensed Bands", IEEE Std 802. 16e-2005 and IEEE Std 802.16-2004/Cor1-2005, New York, NY, Feb. 28, 2006.

(Continued)

*Primary Examiner* — Hadi Armouche
(74) *Attorney, Agent, or Firm* — H.C. Park & Associates, PLC

(57) ABSTRACT

A system for providing security in a mobile Microwave Access (WiMAX) network system is constructed with a licensed certification authority providing a certificate and a first encryption module storing the certificate provided by the licensed certification authority, encrypting a traffic encryption key and a message generated by the first encryption module with the stored certificate, and transmitting the encrypted traffic encryption key and message to a destination. When receiving a message encrypted with a traffic encryption key, the first encryption module decrypts the received message with the traffic encryption key generated by the first encryption module and processes the message. The system is further constructed with a second encryption module. When receiving the message encrypted with the certificate from the first encryption module, the second encryption module decrypts the received message with the certificate provided by the licensed certification authority to detect the traffic encryption key, and encrypts a message with the detected traffic encryption key to transmit the encrypted message.

8 Claims, 8 Drawing Sheets

OTHER PUBLICATIONS

"WiMAX End-to End Network Systems Architecture ( Stage2: Architecture Tenets, Reference Model and Reference Points: 3GPP-WiMAX Interworking; 3GPP2-WiMAX Interworking; Part 0; Part 1; Part 2; Part 3-Informative Annex; WiMAX Interworking with DSL; and WiMAX Support for IMS) ", 2006 WiMAX Forum, Aug. 8, 2006 Release 1 V & V DRAFT.

"WiMAX End-to End Network Systems Architecture (stage3: Detailed Protocols and Procedures)", 2006 WiMZX Forum, Aug. 8, 2006 Release 1 V & V DRAFT.

Whitfield Diffie et al., "New Directions in Cryptography", the IEEE Information Workshop in Lenox, MA, Jun. 23-25, 1975 and the IEEE International Symposium on Information Theory in Ronneby, Sweden, Jun. 21-24, 1976.

Jeff Mandin, "Privacy Key Management version 2", IEEE C802e. 16e-04/131, submitted on Jun. 26, 2004.

"Decision of Grant" issued by Korean Intellectual Property Office in the Applicant's corresponding patent application No. 2006-0131971.

\* cited by examiner

SYSTEM AND METHOD FOR PROVIDING SECURITY IN MOBILE WIMAX NETWORK SYSTEM

CLAIM OF PRIORITY

This application makes reference to, incorporates the same herein, and claims all benefits accruing under 35 U.S.C. §119 from an application entitled SYSTEM AND METHOD FOR PROVIDING SECURITY IN MOBILE WiMAX NETWORK SYSTEM earlier filed in the Korean Intellectual Property Office on 21 Dec. 2006 and there duly assigned Ser. No. 10-2006-0131971.

BACKGROUND OF THE INVENTION

1. Field of the Invention

The present invention relates to a system and method for providing security in a mobile Microwave Access (WiMAX) network system.

2. Description of the Related Art

A mobile Worldwide Interoperability for Microwave Access (WiMAX) network system is usually constructed with at least one mobile station, a radio access station, an access control router, an Authentication, Authorization, and Accounting (AAA) server, and a licensed certification authority. A network between the radio access station and the access control router is an Access Service Network (ASN), and a network between the access control router and the Authentication, Authorization, and Accounting (AAA) server is a Connectivity Service Network (CSN).

The mobile station may be a portable subscriber station and provides mobile Internet service.

The radio access station (RAS) is located at an endpoint of a wireline network and communicates with the mobile station via a wireless interface.

The Access Control Router (ACR) controls the mobile station and the radio access station and routes Internet Protocol (IP) packets.

The licensed certification authority provides the same certificate to the radio access station, the access control router, and the Authentication, Authorization, and Accounting (AAA) server.

The Authentication, Authorization, and Accounting (AAA) server performs authentication, authorization and accounting on a user and the mobile station, such that a Microwave Access (WiMAX) Internet service is provided to the user when the user is authenticated and authorized.

Security is the most critical issue in providing the Microwave Access (WiMAX) service, which is a mobile Internet service. An initial mobile station (MS) entry procedure in a typical mobile Microwave Access (WiMAX) network system defined in the Microwave Access (WiMAX) Forum will now be described.

First, the mobile station receives an Uplink-map (UL-MAP) message from the radio access station. The Uplink-map (UL-MAP) message includes a plurality of initial ranging codes. The mobile station selects one of the plurality of ranging codes and transmits the selected ranging code to the radio access station.

After performing such a ranging-code selection process, the radio access station and the mobile station perform a ranging process by exchanging a ranging request message (RNG-REQ) and a ranging response message (RNG-RSP) with each other. This process is described in greater detail in the Institute of Electrical and Electronics Engineers (IEEE) 802.16e, section 6.3.2.3.5.

Subsequent to the ranging process, the mobile station and the radio access station perform a Mobile station (MS) basic capability (BC) negotiation process. First, the mobile station transmits a Subscriber station Basic Capability (SBC) request message (SBC-REQ) to the radio access station. Upon receipt of the Subscriber station Basic Capability (SBC) request message, the radio access station transmits a NetEntry Mobile station (MS) State Change Request Message to the access control router to request an authorization policy.

The access control router transmits a NetEntry Mobile station (MS) State Change Response Message to the radio access station to deliver the authorization policy. A Subscriber station Basic Capability (SBC) response message (SBC-RSP) including the authorization policy received from the access control router is transmitted from the radio access station to the mobile station. Since the authorization policy includes an authentication method to be performed by the mobile station, the procedure corresponds to security negotiation. Subsequently, a Privacy Key Management (PKM) authentication procedure is performed.

The access control router transmits an Extensible Authentication Protocol (EAP) request code and identity to the radio access station according to the authentication relay protocol (AuthRelay-EAP-Transfer). In response thereto, the radio access station transmits a Privacy Key Management (PKM) response message to the mobile station to deliver the Extensible Authentication Protocol (EAP) request code and identity.

The mobile station transmits a response to the Extensible Authentication Protocol (EAP) request to the access control router via the radio access station. Specifically, the mobile station responds with a Privacy Key Management (PKM) request message (PKM-REQ) to the radio access station (EAP response/identity-Network Access Identifier (NA)). The radio access station transmits the Extensible Authentication Protocol (EAP) response from the mobile station to the access control router by using an authentication relay protocol. The response includes a Network Access Identifier.

An Extensible Authentication Protocol (EAP) authentication procedure is performed by using the network access identifier. When the authentication procedure is successful, authentication success is reported to the mobile station through a context-report message and a Privacy Key Management (PKM) response message PKM-RSP.

The radio access station and the mobile station perform 3-way handshaking as defined in the PKM version 2, and hereby incorporated by reference. The 3-way handshaking procedure is a process of transmitting a Standards Association Traffic Encryption Key challenge (SA-TEK-challenge) message, a Standards Association Traffic Encryption Key request (SA-TEK-request) message and a Standards Association Traffic Encryption Key response (SA-TEK-response) message.

Following the 3-way handshaking procedure, the mobile station requests a Traffic Encryption Key (TEK) from radio access station. The radio access station sends the traffic encryption key to the mobile station. The Privacy Key Management (PKM) authentication procedure then ends.

As the Privacy Key Management (PKM) authentication procedure ends, the mobile station and the radio access station perform secure data communication using the TEK.

The method for providing security between the mobile station and radio access station in the mobile Microwave Access (WiMAX) network system has been described so far.

The method for providing security between the mobile station and the radio access station is standardized in the Institute of Electrical and Electronics Engineers (IEEE)

802.16e and provides a Privacy Key Management (PKM)-based security service. That is, contemporary security schemes defined in the Institute of Electrical and Electronics Engineers (IEEE) 802.16e standard document, "*IEEE Standard for Local and metropolitan area networks Part 16: Air Interface for Fixed and Mobile Broadband Wireless Access Systems*", by IEEE Computer Society and the IEEE Microwave Theory and Techniques Society, published on 28 Feb. 2006, and hereby incorporated by reference, and the Microwave Access (WiMAX) Forum's Network Working Group (NWG) stage documents, "*WiMAX End-to-End Network Systems Architecture, Stage 2: Architecture Tenets, Reference Model and Reference Points*", by WiMAX Forum Proprietary, published on 8 Aug. 2006 and hereby incorporated by reference, and "*WiMAX End-to-End Network Systems Architecture, Stage 3: Detailed Protocols and Procedures*", by WiMAX Forum Proprietary, published on 8 Aug. 2006 and hereby incorporated by reference, recommend performing RSA authentication developed by RSA Security or Extensible Authentication Protocol (EAP) authentication based on PKM version (PKMv2) in an initial network entry process.

Accordingly, separate security functionality is not provided for security contexts exchanged prior to successful authentication in the initial network entry process.

Wireless traffic encryption functionality is provided for message exchange between the mobile station and the radio access station though Privacy Key Management (PKM) authentication and key exchange, but not for message exchanges in the Access Service Network (ASN) and between the Access Service Network (ASN) and the Connectivity Service Network (CSN).

In particular, a guideline for security of a network reference model proposed by the Microwave Access (WiMAX) Forum states that message exchange in the Access Service Network (ASN) is assumed to be performed in a reliable domain and that security functionality may be provided for message exchange between the Access Service Network (ASN) and the Connectivity Service Network (CSN), and in particular, for exchange of authentication-related messages between the Access Service Network (ASN) and an Authentication, Authorization, and Accounting (AAA) server in the Connectivity Service Network (CSN), via an Internet Protocol (IP) Security (IPSec) tunnel.

In the case of the contemporary mobile Microwave Access (WiMAX) network system, however, a Microwave Access (WiMAX) Forum does not apply a specific security scheme to the access network section consisting of the Access Service Network (ASN) and the Connectivity Service Network (CSN).

A contemporary Access Service Network (ASN) security technique is vulnerable to rogue radio access station/traffic analysis attacks because the inside of the Access Service Network (ASN) is just assumed to be a secure domain for exchange of Subscriber station Basic Capability (SBC) negotiation/authentication-related messages in an Access Service Network (ASN) section between the radio access station and the Access Service Network (ASN)/Gateway (GW).

Likewise, although critical messages for user/terminal authentication in connection with the Authentication, Authorization, and Accounting (AAA) server are exchanged in a network section between the Access Service Network (ASN) and the Connectivity Service Network (CSN), the Network Working Group (NWG) merely sets forth availability of the Authentication, Authorization, and Accounting (AAA) server capable of interworking with IPSec, and authentication/key-related information may be leaked to unauthorized third party entities by a traffic analysis attack.

SUMMARY OF THE INVENTION

It is an object of the present invention to provide an improved system and method for providing security in a mobile Microwave Access (WiMAX) network system.

It is another object of the present invention to provide a system and method for providing security in a mobile Microwave Access (WiMAX) network system capable of providing security functionality for message exchange in an Access Service Network (ASN) consisting of a radio access station and an Access Service Network/Gateway (ASN/GW), and providing security functionality for message exchange between the Access Service Network (ASN) and the Connectivity Service Network (CSN).

A first aspect of the present invention provides a system for providing security in a mobile Microwave Access (WiMAX) network system. The system is constructed with: a licensed certification authority providing a certificate and a first encryption module storing the certificate provided by the licensed certification authority, encrypting a traffic encryption key and a message generated by the first encryption module with the stored certificate, and transmitting the traffic encryption key message encrypted with the certificate to a destination. When the first encryption module receives a message encrypted with a traffic encryption key, the first encryption module decrypts the received message with the traffic encryption key generated by the first encryption module, and processes the message. The system is further constructed with a second encryption module. When the second encryption module receives the traffic encryption key message encrypted with the certificate from the first encryption module, the second encryption module decrypts the received message with the certificate provided by the licensed certification authority to detect the traffic encryption key, encrypts a message with the detected traffic encryption key, and transmits the encrypted message.

The first encryption module may be constructed with: a certificate storage unit storing the certificate provided by the licensed certification authority; an encryption key generator generating the traffic encryption key; an authentication message generator encrypting the traffic encryption key generated by the encryption key generator and the message with the certificate provided by the licensed certification authority, and transmitting the traffic encryption key message encrypted with the certificate to the access control router; and a message authentication processor for, when receiving a message encrypted with a traffic encryption key from the access control router, decrypting the received message with the traffic encryption key generated by the encryption key generator, so that the authentication is completed.

The second encryption module may be constructed with: a certificate storage unit storing the certificate provided by the licensed certification authority; a certificate decryptor for, when receiving the traffic encryption key message encrypted with the certificate, detecting the traffic encryption key through the certificate stored in the certificate storage unit, the traffic encryption key being authenticated and received together with the message, and obtaining an actual message; and a message encryptor for encrypting the actual message with the traffic encryption key detected by the certificate decryptor and transmitting the encrypted message.

The first encryption module and the second encryption module may be disposed in each of the radio access station, the access control router and the Authentication, Authorization, and Accounting (AAA) server of the mobile Microwave Access (WiMAX) network system.

The message encrypted with the certificate may include timestamp information.

A second aspect of the present invention provides a method for providing security in a mobile Microwave Access (WiMAX) network system. The method includes the steps of: receiving, by the radio access station and the access control router, the same certificate from a licensed certification authority; generating, by the radio access station, an Access Service Network Traffic Encryption Key (i.e., asn_TEK); encrypting, by the radio access station, a message to be transmitted with the generated Access Service Network Traffic Encryption Key (asn_TEK) and transmitting the encrypted message to the access control router; verifying, by the access control router, the certificate of the licensed certification authority appended to the message received from the radio access station to check the Access Service Network Traffic Encryption Key (asn_TEK), and decrypting the message received from the radio access station to obtain an actual message; and encrypting, by the access control router, the actual message with the checked Access Service Network Traffic Encryption Key (asn_TEK) and transmitting the encrypted message to the radio access station.

A third aspect of the present invention provides a method for providing security in a mobile Microwave Access (WiMAX) network system. The method includes the steps of: receiving, by the radio access station and the access control router, the same certificate from a licensed certification authority; generating, by the access control router, an asn-Traffic Encryption Key (TEK); encrypting, by the access control router, a message to be transmitted with the generated Access Service Network Traffic Encryption Key (asn_TEK) and transmitting the encrypted message to the radio access station; verifying, by the radio access station, the certificate of the licensed certification authority appended to the message received from the access control router to check the Access Service Network Traffic Encryption Key (asn_TEK), and decrypting the message received from the access control router to obtain an actual message; and encrypting, by the radio access station, the actual message with the checked Access Service Network Traffic Encryption Key (asn_TEK) and transmitting the encrypted message to the access control router.

The Access Service Network Traffic Encryption Key (asn_TEK) may include a timestamp. The Access Service Network Traffic Encryption Key (asn_TEK) may be encrypted with a public key, and may include the certificate of the licensed certification authority and a timestamp.

A fourth aspect of the present invention provides a method for providing security in a mobile Microwave Access (WiMAX) network system. The method may include the steps of: receiving, by the access control router and the Authentication, Authorization, and Accounting (AAA) server, the same certificate from a licensed certification authority; generating, by the access control router, an Access Service Network—Connectivity Service Network Traffic Encryption Key (i.e., asn-csn-TEK); encrypting, by the access control router, a message to be transmitted with the generated Access Service Network Connectivity Service Network Traffic Encryption Key (asn-csn-TEK) and transmitting the encrypted message to the Authentication, Authorization, and Accounting (AAA) server; verifying, by the Authentication, Authorization, and Accounting (AAA) server, the certificate of the licensed certification authority appended to the message received from the access control router to check the Access Service Network Connectivity Service Network Traffic Encryption Key (asn-csn-TEK), and decrypting the message received from the access control router to obtain an actual message; and encrypting, by the Authentication, Authorization, and Accounting (AAA) server, the message with the checked Access Service Network Connectivity Service Network Traffic Encryption Key (asn-csn-TEK) and transmitting the encrypted message to the access control router.

A fifth aspect of the present invention provides a method for providing security in a mobile Microwave Access (WiMAX) network system. The method includes the steps of: receiving, by the access control router and the Authentication, Authorization, and Accounting (AAA) server, the same certificate from a licensed certification authority; generating, by the Authentication, Authorization, and Accounting (AAA) server, an asn-csn-Traffic Encryption Key (TEK); encrypting, by the Authentication, Authorization, and Accounting (AAA) server, a message to be transmitted with the generated Access Service Network Connectivity Service Network Traffic Encryption Key (asn-csn-TEK) and transmitting the encrypted message to the access control router; verifying, by the access control router, the certificate of the licensed certification authority appended to the message received from the Authentication, Authorization, and Accounting (AAA) server to check the Access Service Network Connectivity Service Network Traffic Encryption Key (asn-csn-TEK), and decrypting the message received from the Authentication, Authorization, and Accounting (AAA) server to obtain an actual message; and encrypting, by the access control router, the actual message with the checked Access Service Network Connectivity Service Network Traffic Encryption Key (asn-csn-TEK) and transmitting the encrypted message to the Authentication, Authorization, and Accounting (AAA) server.

The Access Service Network Connectivity Service Network Traffic Encryption Key (asn-csn-TEK) may comprise a timestamp. The Access Service Network Connectivity Service Network Traffic Encryption Key (asn-csn-TEK) may be encrypted with a public key and may comprise the certificate of the licensed certification authority and a timestamp.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Hereinafter, exemplary embodiments of the present invention will be described in detail with reference to the accompanying drawings. For the sake of clarity and conciseness, matters related to the invention that are well known in the art will not be described.

Figure 1:
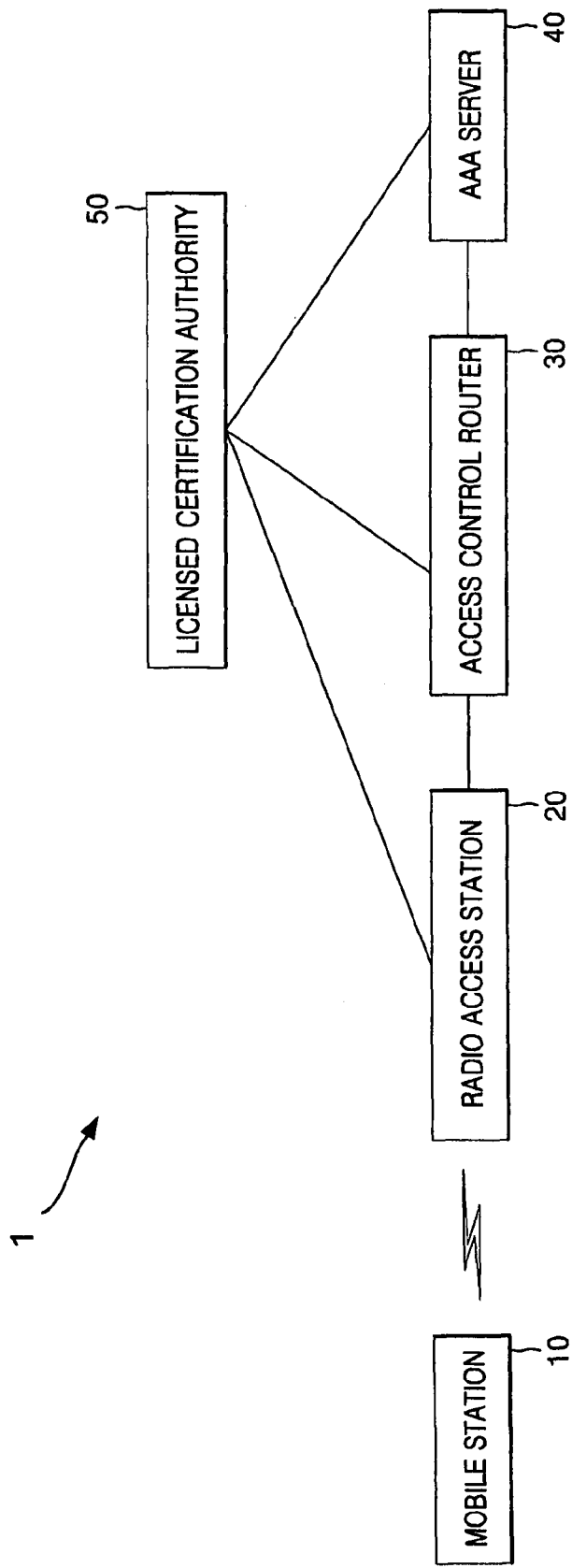
FIG. 1 is a block diagram of a mobile Microwave Access (WiMAX) network system.

FIG. 1 is a block diagram of a mobile Worldwide Interoperability for Microwave Access (WiMAX) network system. Mobile Microwave Access (WiMAX) network system 1 may include: mobile station 10; radio access station 20 in wireless Internet communication with mobile station 10; access control router 30 in Internet Protocol (IP) network communication with radio access station 20; Authentication, Authorization, and Accounting (AAA) server 40; and licensed certification authority 50. A network between radio access station 20 and access control router 30 is an Access Service Network (ASN), and a network between access control router 30 and Authentication, Authorization, and Accounting (AAA) server 40 is a Connectivity Service Network (CSN).

Mobile station (MS) 10 may be a portable subscriber station that provides mobile Internet service.

Radio access station (RAS) 20 is located at an endpoint of a wireline network and communicates with mobile station 10 via a wireless interface.

Access Control Router (ACR) 30 controls mobile station 10 and radio access station 20, and routes Internet Protocol (IP) packets.

Licensed certification authority 50 provides the same certificate to radio access station 20, access control router 30, and Authentication, Authorization, and Accounting (AAA) server 40.

Authentication, Authorization, and Accounting (AAA) server 40 performs authentication, authorization and accounting on a user and mobile station 10, such that a Microwave Access (WiMAX) Internet service is provided to the user when the user is authenticated and authorized.

Security is the most critical issue in providing the Microwave Access (WiMAX) service, which is a mobile Internet service. A mobile-station authentication procedure defined in the Microwave Access (WiMAX) Forum will now be described.

Figure 2:
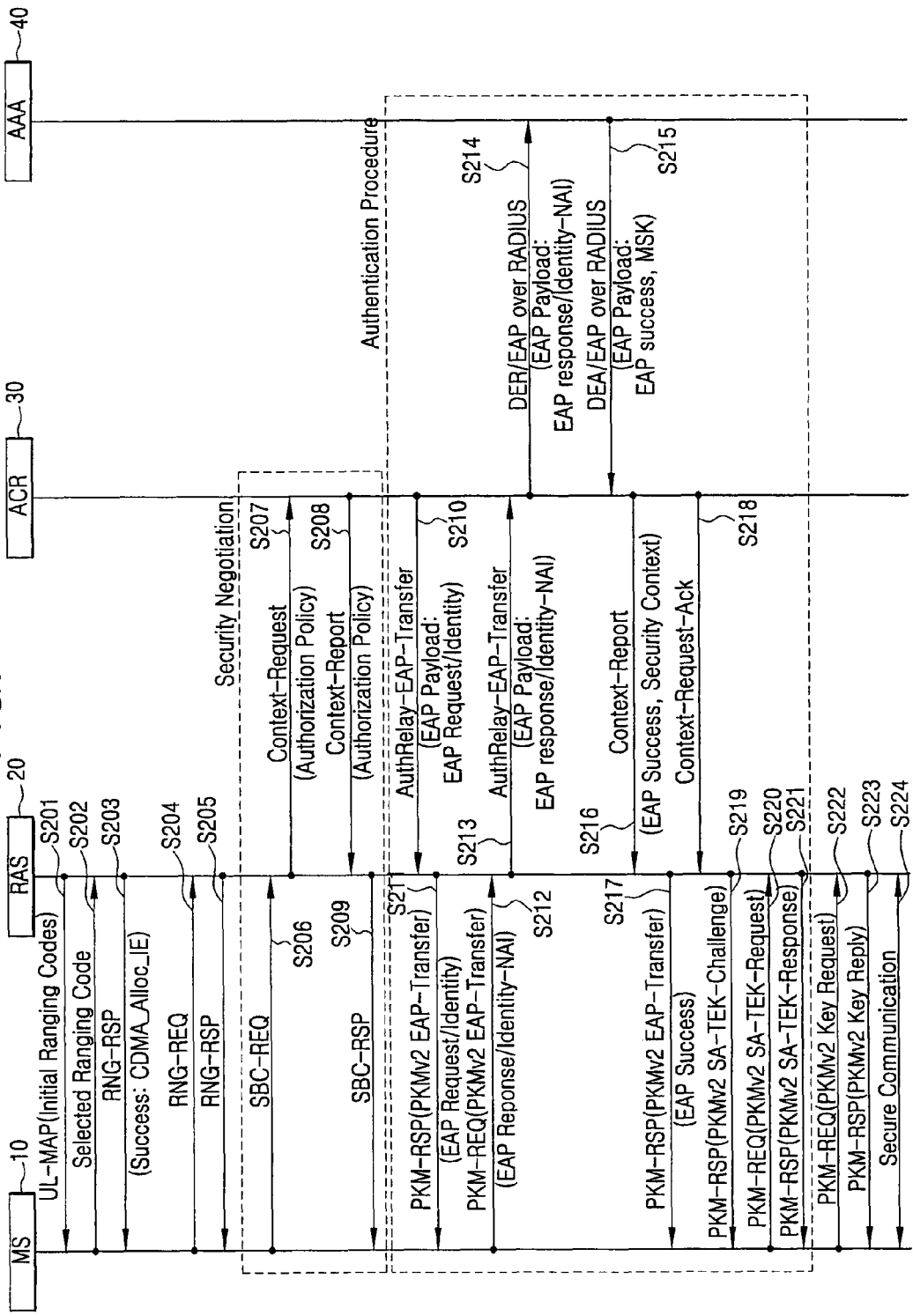
FIG. 2 is a flowchart illustrating an initial Mobile station (MS) entry procedure in a typical mobile Microwave Access (WiMAX) network system.

FIG. 2 is a flowchart illustrating an initial Mobile station (MS) entry procedure in a typical mobile Microwave Access (WiMAX) network system.

First, mobile station 10 receives an uplink map message (UL-MAP) from radio access station 20 (S201). The UL-MAP message includes a plurality of initial ranging codes. Mobile station 10 selects one of the plurality of ranging codes and transmits the selected ranging code to radio access station 20 (S202).

After performing such a ranging-code selection process, radio access station 20 and mobile station 10 perform a ranging process by exchanging a ranging request (RNG-REQ) message and a ranging response message (RNG-RSP) with each other (S203 and S204). This process is described in greater detail in the Institute of Electrical and Electronics Engineers (IEEE) 802.16e, section 6.3.2.3.5, and hereby incorporated by reference.

Subsequent to the ranging process (S201 to S204), mobile station 10 and radio access station 20 perform an Mobile station (MS) basic capability (BC) negotiation process. First, mobile station 10 transmits an Subscriber station Basic Capability (SBC) request message (SBC-REQ) to radio access station 20 (S206). Upon receipt of the Subscriber station Basic Capability (SBC) request message, radio access station 20 transmits a NetEntry Mobile station (MS) State Change Request Message to access control router 30 to request an authorization policy (S207).

Access control router 30 transmits a NetEntry Mobile station (MS) State Change Response Message to radio access station 20 to deliver authorization policy (S208). A Subscriber station Basic Capability (SBC) response message (SBC-RSP) including the authorization policy received from access control router 30 is transmitted from radio access station 20 to mobile station 10 (S209). Since the authorization policy includes an authentication method to be performed by mobile station 10, procedure (S206 to S209) corresponds to security negotiation. Subsequently, a Privacy Key Management (PKM) authentication procedure is performed.

Access control router 30 transmits an Extensible Authentication Protocol (EAP) request code and identity to radio access station 20 according to the authentication relay protocol (AuthRelay-EAP-Transfer) (S210). In response to the Extensible Authentication Protocol (EAP) request code, radio access station 20 transmits a Privacy Key Management (PKM) response message to mobile station 10 to deliver the Extensible Authentication Protocol (EAP) request code and identity (S211).

Mobile station 10 transmits a response to the Extensible Authentication Protocol (EAP) request to access control router 30 via radio access station 20. Specifically, mobile station 10 responds with a Privacy Key Management (PKM) request message (PKM-REQ) to radio access station 20 to deliver an Extensible Authentication Protocol (EAP) response including an identity (NAI) (S212). Radio access station 20 transmits the Extensible Authentication Protocol (EAP) response from the mobile station to access control router 30 by using an authentication relay protocol (S213). The response includes a Network Access Identifier (NAI).

An Extensible Authentication Protocol (EAP) authentication procedure (S214 and S215) is performed by using the network access identifier. When the authentication procedure is successful, authentication success is reported to mobile station 10 through a context-report message and a Privacy Key Management (PKM) response message PKM-RSP (S216 and S217).

Radio access station 20 and mobile station 10 perform 3-way handshaking as defined in the PKM version 2, and hereby incorporated by reference. The 3-way handshaking procedure is a process of transmitting a Standards Association Traffic Encryption Key (SA-TEK)-challenge message, a Standards Association Traffic Encryption Key request (SA-TEK-request) message and a Standards Association Traffic Encryption Key response (SA-TEK-response) message (S219, S220 and S221).

Following the 3-way handshaking procedure, mobile station 10 requests a Traffic Encryption Key (TEK) from radio access station 20 (S222). Radio access station 20 sends the traffic encryption key to mobile station 10 (S223). This concludes the Privacy Key Management (PKM) authentication procedure.

As the Privacy Key Management (PKM) authentication procedure ends, mobile station 10 and radio access station 20 perform secure data communication using the Traffic Encryption Key (TEK) (S224).

The method for providing security between mobile station 10 and radio access station 20 in the mobile Microwave Access (WiMAX) network system has been described so far.

The method for providing security between the mobile station and the radio access station is standardized in the Institute of Electrical and Electronics Engineers (IEEE) 802.16e and provides a PKM-based security service. That is, contemporary security schemes defined in the Institute of Electrical and Electronics Engineers (IEEE) 802.16e standard document entitled "*IEEE Standard for Local and metropolitan area networks Part* 16: *Air Interface for Fixed and Mobile Broadband Wireless Access Systems*", by IEEE Computer Society and the IEEE Microwave Theory and Techniques Society, published on 28 Feb. 2006, and hereby incorporated by reference, and the Microwave Access (WiMAX) Forum's Network Working Group (NWG) stage documents entitled "*WiMAX End-to-End Network Systems Architecture, Stage* 2: *Architecture Tenets, Reference Model and Reference Points*", by WiMAX Forum Proprietary, published on 8 Aug. 2006 and hereby incorporated by reference, and "*WiMAX End-to-End Network Systems Architecture, Stage* 3: *Detailed Protocols and Procedures*", by WiMAX Forum Proprietary, published on 8 Aug. 2006 and hereby incorporated by reference, recommend performing RSA authentication developed by RSA Security or Extensible Authentication Protocol (EAP) authentication based on PKM version (PKMv2) in an initial network entry process.

Accordingly, separate security functionality is not provided for security contexts exchanged prior to successful authentication in the initial network entry process.

Wireless traffic encryption functionality is provided for message exchange between mobile station 10 and radio access station 20 though Privacy Key Management (PKM) authentication and key exchange, but not for message exchanges in the Access Service Network (ASN) and between the Access Service Network (ASN) and the Connectivity Service Network (CSN) (S201, S207, S208, and S213).

In particular, a guideline for security of a network reference model proposed by the Microwave Access (WiMAX) Forum states that message exchange in the Access Service Network (ASN) is assumed to be performed in a reliable domain and that security functionality may be provided for message exchange between the Access Service Network (ASN) and the Connectivity Service Network (CSN), and in particular, for exchange of authentication-related messages between the Access Service Network (ASN) and an Authentication, Authorization, and Accounting (AAA) server in the Connectivity Service Network (CSN), via an Internet Protocol (IP) Security (IPSec) tunnel.

In the case of the contemporary mobile Microwave Access (WiMAX) network system, however, a Microwave Access (WiMAX) Forum does not apply a specific security scheme to the access network section consisting of the Access Service Network (ASN) and the Connectivity Service Network (CSN).

A contemporary Access Service Network (ASN) security technique is vulnerable to rogue radio access station/traffic analysis attacks because the inside of the Access Service Network (ASN) is just assumed to be a secure domain for exchange of Subscriber station Basic Capability (SBC) negotiation/authentication-related messages in an Access Service Network (ASN) section between the radio access station and the Access Service Network Gateway (ASN/GW).

Likewise, although critical messages for user/terminal authentication in connection with the Authentication, Authorization, and Accounting (AAA) server are exchanged in a network section between the Access Service Network (ASN) and the Connectivity Service Network (CSN), the Network Working Group (NWG) merely sets forth availability of the Authentication, Authorization, and Accounting (AAA) server capable of interworking with IPSec, and authentication/key-related information may be leaked out by a traffic analysis attack.

Figure 3:
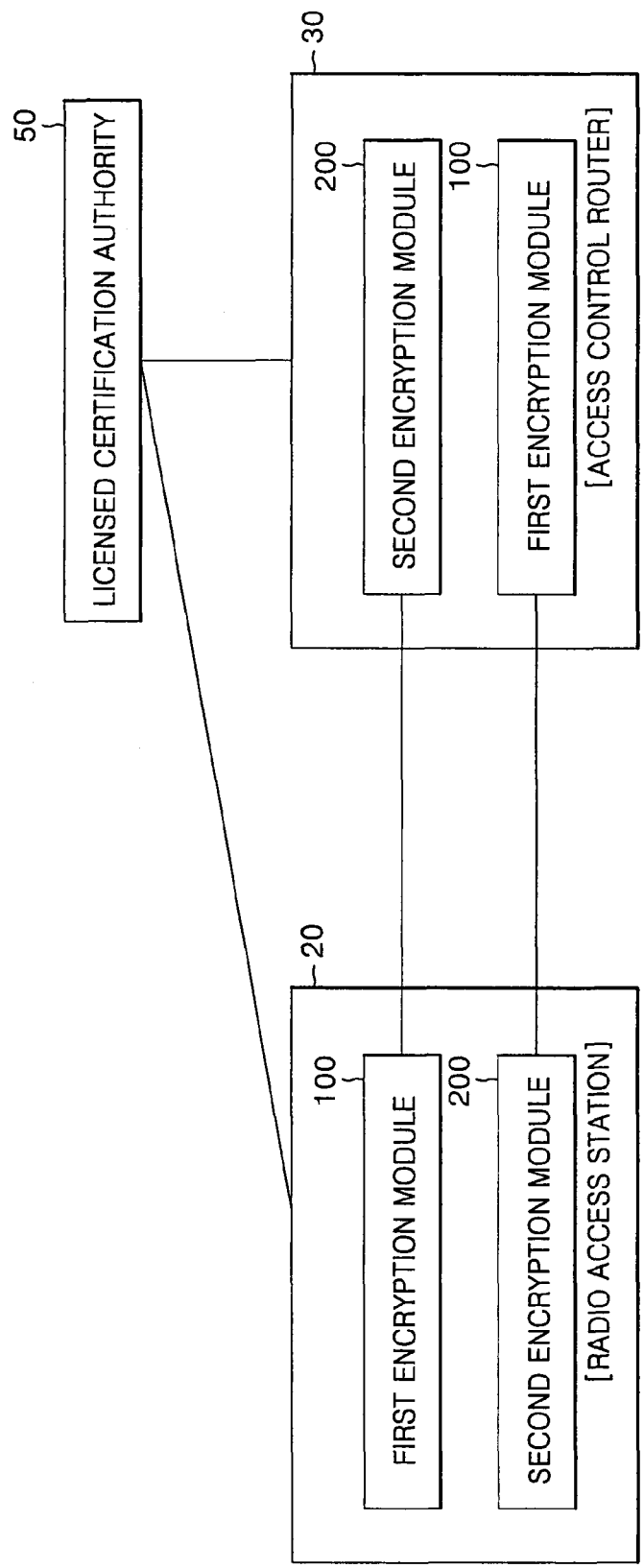
FIG. 3 is a block diagram of a security system in a mobile Microwave Access (WiMAX) network system according to a first embodiments of the principles of the present invention.

FIG. 3 is a block diagram of a security system in a mobile Microwave Access (WiMAX) network system according to a first embodiment of the principles of the present invention. The security system in the mobile Microwave Access (WiMAX) network system according to the first embodiment of the principles of the present invention is constructed with a licensed certification authority 50 for providing a certificate, first encryption modules 100, and second encryption modules 200.

First encryption module 100 and second encryption module 200 are disposed in each of radio access station 20, access control router 30, and Authentication, Authorization, and Accounting (AAA) server 40.

Licensed certification authority 50 provides the same certificate to radio access station 20, access control router 30, and Authentication, Authorization, and Accounting (AAA) server 40.

Figure 4:
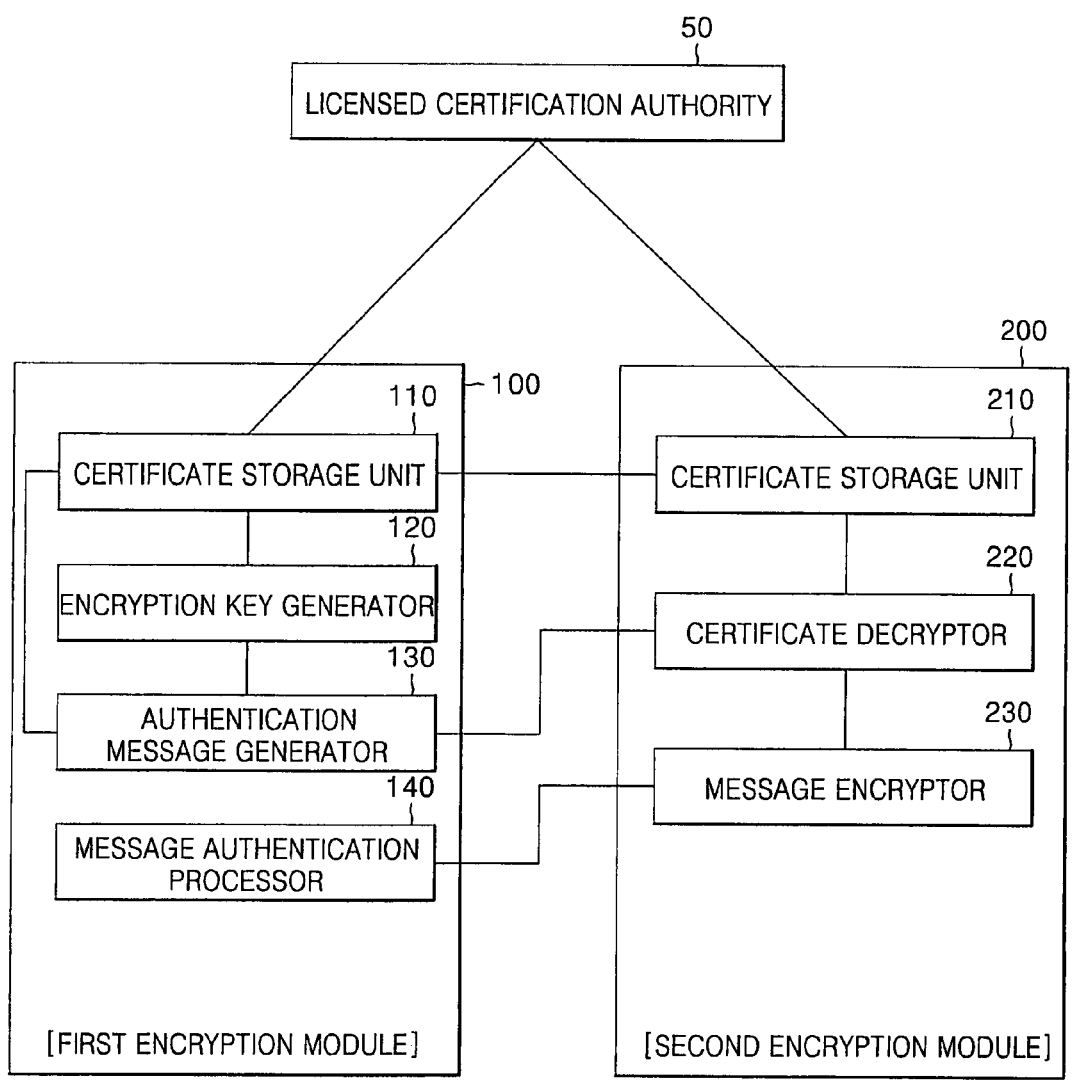
FIG. 4 is a block diagram of a first encryption module and a second encryption module in the security system of the mobile Microwave Access (WiMAX) network system in FIG. 3.

First encryption module 100 stores the certificate provided by licensed certification authority 50, encrypts an encryption key, i.e., an Access Service Network Traffic Encryption Key (asn_TEK), generated by first encryption module 100 with the stored certificate, and transmits the encrypted Access Service Network Traffic Encryption Key (asn_TEK) to a destination. Upon receipt of a message encrypted with the Access Service Network Traffic Encryption Key (asn_TEK), first encryption module 100 decrypts the received message with the Access Service Network Traffic Encryption Key (asn_TEK) generated by first encryption module 100 and processes the message. Referring to FIG. 4, first encryption module 100 includes a certificate storage unit 110, an encryption key generator 120, an authentication message generator 130, and a message authentication processor 140.

In first encryption module 100, certificate storage unit 110 stores the certificate provided by licensed certification authority 50.

Encryption key generator 120 generates an encryption key, i.e., an Access Service Network Traffic Encryption Key (asn_TEK).

Authentication message generator 130 encrypts the Access Service Network Traffic Encryption Key (asn_TEK) generated by encryption key generator 120 and a message with the certificate provided by licensed certification authority 50, and transmits the Access Service Network Traffic Encryption Key (asn_TEK) message encrypted with the certificate to access control router 30.

When a message encrypted with an Access Service Network Traffic Encryption Key (asn_TEK) is received from access control router 30, message authentication processor 140 decrypts the received message with the Access Service Network Traffic Encryption Key (asn_TEK) generated by encryption key generator 120. Accordingly, the authentication is completed.

When the Access Service Network Traffic Encryption Key (asn_TEK) message encrypted with the certificate is received from first encryption module 100, second encryption module 200' decrypts the received message with the certificate provided by licensed certification authority 50 to detect the Access Service Network Traffic Encryption Key (asn_TEK), and encrypts a message with the detected Access Service Network Traffic Encryption Key (asn_TEK) to transmit the message encrypted with the Access Service Network Traffic Encryption Key (asn_TEK). Referring to FIG. 4, second encryption module 200 includes a certificate storage unit 210, a certificate decryptor 220, and a message encryptor 230.

In second encryption module 200, certificate storage unit 210 stores the certificate provided by licensed certification authority 50.

Upon receipt of the message encrypted with the certificate from first encryption module 100, certificate decryptor 220 detects the Access Service Network Traffic Encryption Key (asn_TEK) authenticated and transmitted together with the message, using the certificate stored in certificate storage unit 210.

Message encryptor 230 encrypts a message with the Access Service Network Traffic Encryption Key (asn_TEK) detected by certificate decryptor 220 and transmits the encrypted message.

Here, first encryption module 100 and second encryption module 200 are disposed in each one of radio access station 20, access control router 30 and Authentication, Authorization, and Accounting (AAA) server 40 in the mobile Microwave Access (WiMAX) network system. The message encrypted with the certificate further includes timestamp information.

Operation of the above components according to the present invention will now be described, and a description of their general functions will be omitted.

First encryption module 100 and second encryption module 200 are disposed in each one of radio access station 20, access control router 30, and Authentication, Authorization, and Accounting (AAA) server 40.

Licensed certification authority 50 provides the same certificate to radio access station 20, access control router 30, and Authentication, Authorization, and Accounting (AAA) server 40.

Here, it is assumed that first encryption module 100 is disposed in radio access station 20, and second encryption module 200 is disposed in access control router 30, as shown in FIG. 3.

First, first encryption module 100 disposed in radio access station 20 stores the certificate provided by licensed certification authority 50, encrypts an Access Service Network Traffic Encryption Key (asn_TEK) and a message generated by first encryption module 100 with the stored certificate, and transmits the encrypted Access Service Network Traffic Encryption Key (asn_TEK) to access control router 30.

That is, in first encryption module 100, certificate storage unit 110 stores the certificate provided by licensed certification authority 50.

Encryption key generator 120 then generates an encryption key, i.e., an Access Service Network Traffic Encryption Key (asn_TEK).

Authentication message generator 130 then encrypts the Access Service Network Traffic. Encryption Key (asn_TEK) generated by encryption key generator 120 and a message with the certificate provided by licensed certification authority 50, and transmits the Access Service Network Traffic Encryption Key (asn_TEK) message encrypted with the certificate to access control router 30.

When the Access Service Network Traffic Encryption Key (asn_TEK) message encrypted with the certificate is received from first encryption module 100 disposed in radio access station 20, second encryption module 200 disposed in access control router 30 decrypts the received message with the certificate provided by licensed certification authority 50 to detect the Access Service Network Traffic Encryption Key (asn_TEK), and encrypts a message with the detected Access Service Network Traffic Encryption Key (asn_TEK) to transmit the encrypted message.

That is, when the Access Service Network Traffic Encryption Key (asn_TEK) message encrypted with the certificate provided by licensed certification authority 50 is received from first encryption module 100 disposed in radio access station 20, certificate decryptor 220 of second encryption module 200 in access control router 30 detects the Access Service Network Traffic Encryption Key (asn_TEK) authenticated and received together with the message.

Message encryptor 230 encrypts a message with the Access Service Network Traffic Encryption Key (asn_TEK) detected by certificate decryptor 220 and transmits the encrypted message to radio access station 20.

Upon receipt of the message encrypted with the Access Service Network Traffic Encryption Key (asn_TEK) from access control router 30, first encryption module 100 of radio access station 20 decrypts the received message with the Access Service Network Traffic Encryption Key (asn_TEK) generated by encryption key generator 120 in first encryption module 100 and processes the message. That is, upon receipt of the message encrypted with the Access Service Network Traffic Encryption Key (asn_TEK) from access control router 30, message authentication processor 140 of first encryption module 100 decrypts the received message with the Access Service Network Traffic Encryption Key (asn_TEK) generated by encryption key generator 120, so that authentication is completed.

Since the message encrypted with the certificate includes timestamp information, radio access station 20 or access control router 30 may determine an authentication period based on the timestamp.

Figure 5:
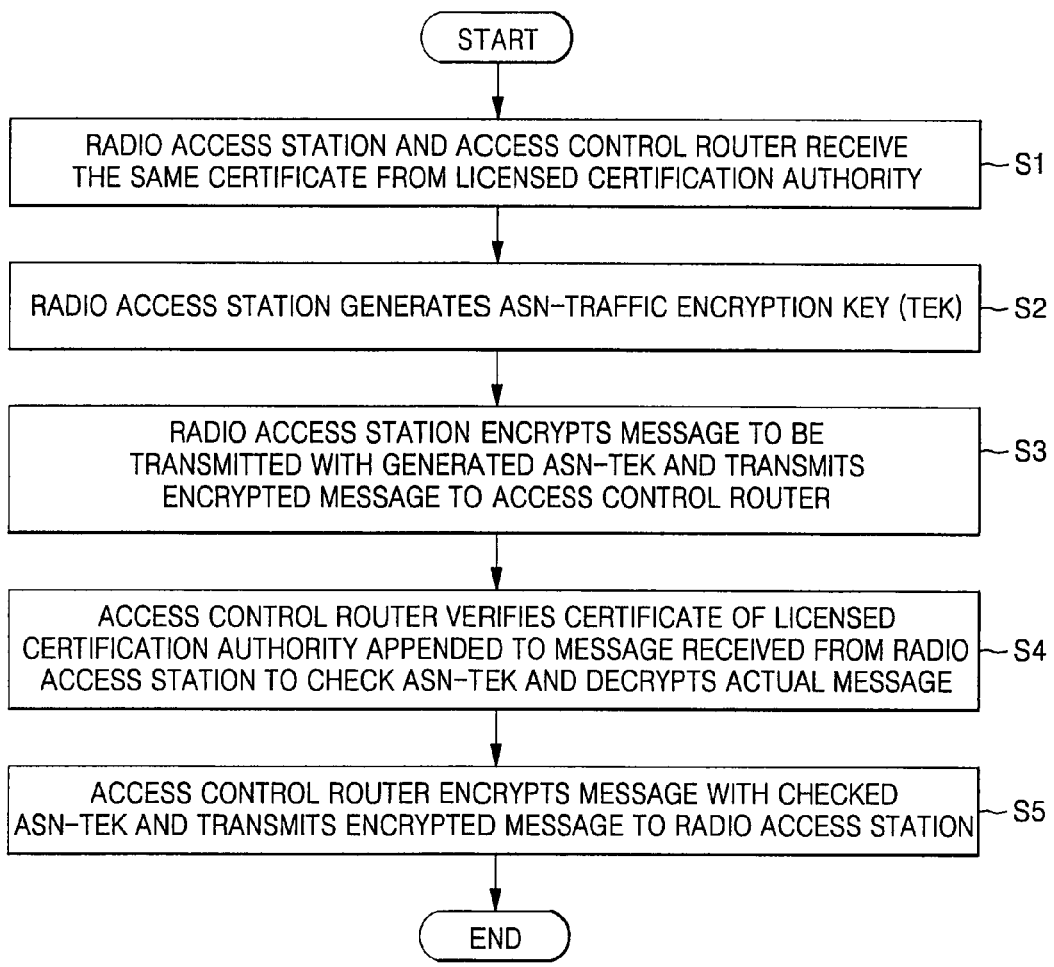
FIG. 5 is a flowchart illustrating a method for providing security between a radio access station and an access control router in a Microwave Access (WiMAX) network system according to the first exemplary embodiment of the principles of the present invention.

A method for providing security between the radio access station and the access control router in the mobile Microwave Access (WiMAX) network system having the above configuration according to the first exemplary embodiment of the principles of the present invention will now be described with reference to FIG. 5. In the first embodiment of the present invention, first encryption module 100 is disposed in radio access station 20, and second encryption module is disposed in access control router 30.

First, radio access station 20 and access control router 30 receive the same certificate from licensed certification authority 50 (S1).

Radio access station 20 then generates an asn-Traffic Encryption Key (TEK) (S2).

Radio access station 20 then encrypts a message to be transmitted with the generated Access Service Network Traffic Encryption Key (asn_TEK) and transmits the encrypted message to access control router 30 (S3).

Access control router 30 then verifies the certificate of licensed certification authority 50 appended to the message received from radio access station 20 to check the Access Service Network Traffic Encryption Key (asn_TEK), and decrypts the message received from radio access station 20 to obtain an actual message (S4). The actual message is the real data which would be transmitted from the access control router and radio access station.

Access control router 30 then encrypts the actual message with the checked Access Service Network Traffic Encryption Key (asn_TEK) and transmits the encrypted message to radio access station 20 (S5).

The Access Service Network Traffic Encryption Key (asn_TEK) generated by radio access station 20 includes a timestamp. The Access Service Network Traffic Encryption Key (asn_TEK) is encrypted with a public key, and may include the certificate from the licensed certificate authority and a timestamp.

Figure 6:
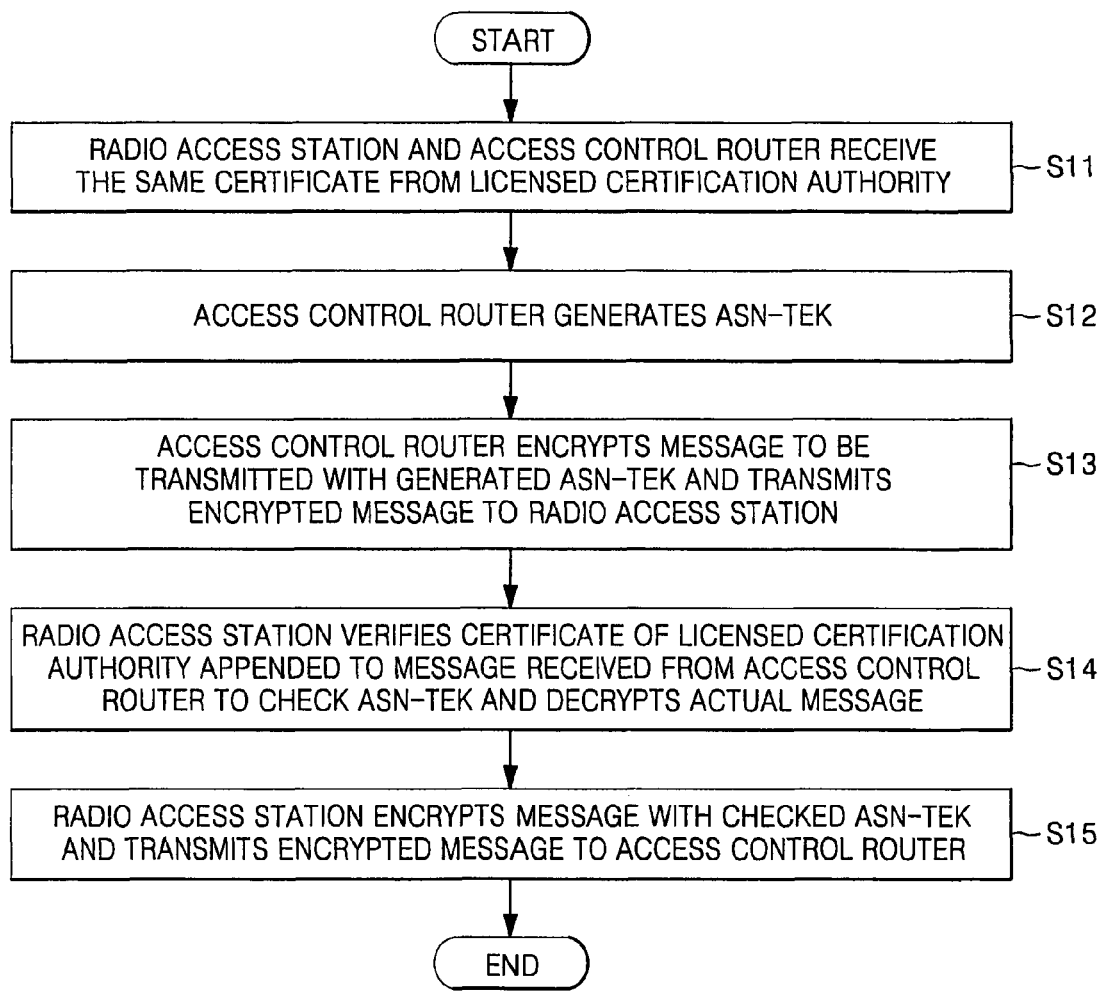
FIG. 6 is a flowchart illustrating a method for providing security between a radio access station and an access control router in a Microwave Access (WiMAX) network system according to a second exemplary embodiment of the principles of the present invention.

A method for providing security between the radio access station and the access control router in the mobile Microwave Access (WiMAX) network system having the above configuration according to a second exemplary embodiment of the principles of the present invention will now be described with reference to FIG. 6.

First, radio access station 20 and access control router 30 receive the same certificate from licensed certification authority 50 (S11).

Access control router 30 then generates an asn-Traffic Encryption Key (TEK) (S12).

Access control router 30 then encrypts a message to be transmitted with the generated Access Service Network Traffic Encryption Key (asn_TEK) and transmits the encrypted message to radio access station 20 (S13).

Radio access station 20 then verifies the certificate of licensed certification authority 50 appended to the message received from access control router 30 to check the Access Service Network Traffic Encryption Key (asn_TEK), and decrypts the message received from access control router 30 to obtain an actual message (S14).

Radio access station 20 then encrypts the actual message with the verified Access Service Network Traffic Encryption Key (asn_TEK) and transmits the encrypted message to access control router 30 (S15).

The Access Service Network Traffic Encryption Key (asn_TEK) generated by access control router 30 includes a timestamp. The Access Service Network Traffic Encryption Key (asn_TEK) is encrypted with a public key, and may include the certificate from the licensed certificate authority and a timestamp.

Figure 7:
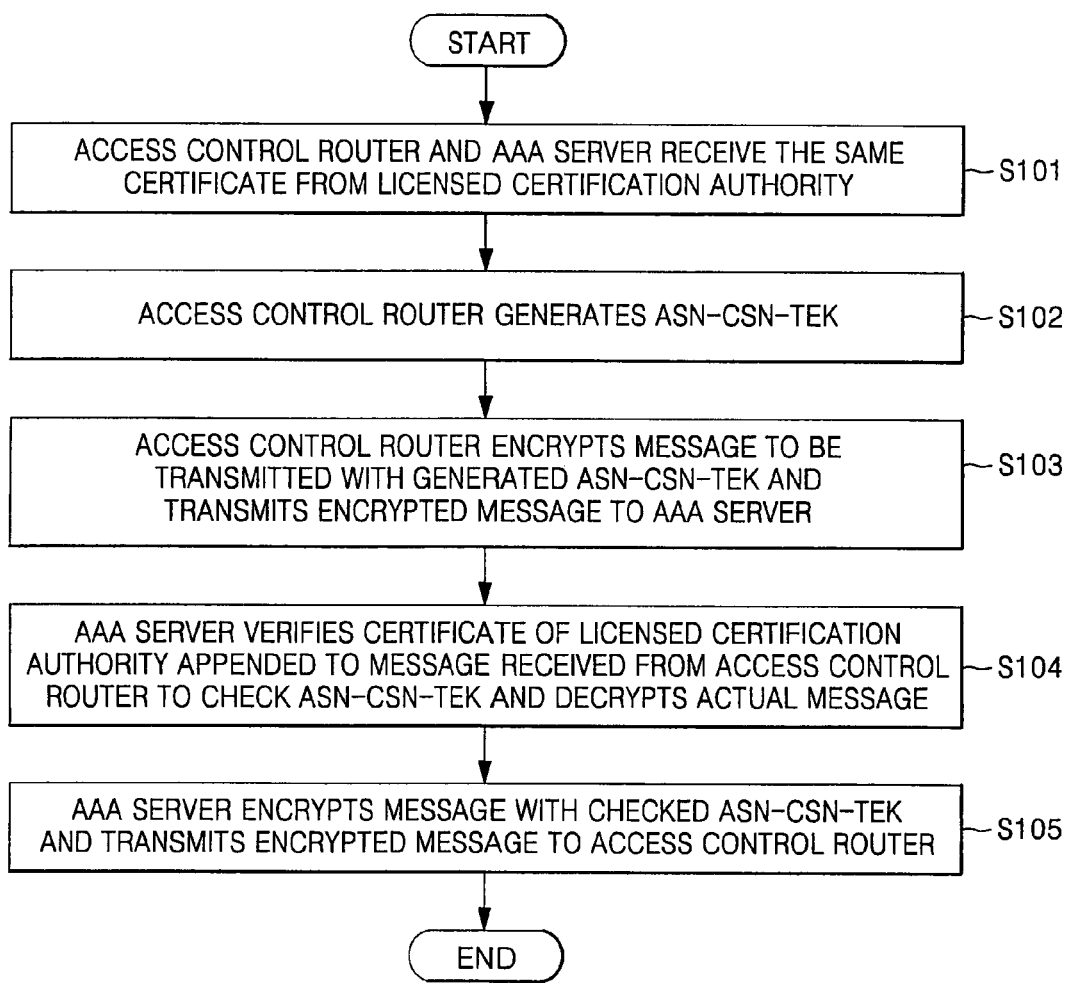
FIG. 7 is a flowchart illustrating a method for providing security between an access control router and an Authentication, Authorization, and Accounting (AAA) server in a Microwave Access, (WiMAX) network system according to a third exemplary embodiment of the principles of the present invention.

A method for providing security between the access control router and the Authentication, Authorization, and Accounting (AAA) server in the mobile Microwave Access (WiMAX) network system having the above configuration according to a third exemplary embodiment of the present invention will be now described with reference to FIG. 7.

First, access control router 30 and Authentication, Authorization, and Accounting (AAA) server 40 receive the same certificate from licensed certification authority 50 (S101).

Access control router 30 then generates an asn-csn-Traffic Encryption Key (TEK) (S102).

Access control router 30 then encrypts a message to be transmitted with the generated Access Service Network Connectivity Service Network Traffic Encryption Key (asn-csn-TEK) and transmits the encrypted message to Authentication, Authorization, and Accounting (AAA) server (S103).

Authentication, Authorization, and Accounting (AAA) server 40 then verifies the certificate of licensed certification authority 50 appended to the message received from access control router 30 to check the Access Service Network Connectivity Service Network Traffic Encryption Key (asn-csn-TEK) and decrypts the message received from access control router 30 to obtain an actual message (S104).

Authentication, Authorization, and Accounting (AAA) server 40 then encrypts the actual message with the verified Access Service Network Connectivity Service Network Traffic Encryption Key (asn-csn-TEK) and transmits the encrypted message to access control router 30 (S105).

The Access Service Network Connectivity Service Network Traffic Encryption Key (asn-csn-TEK) generated by access control router 30 includes a timestamp. The Access Service Network Connectivity Service Network Traffic Encryption Key (asn-csn-TEK) is encrypted with a public key and may include the certificate from the licensed certification authority and the timestamp.

Figure 8:
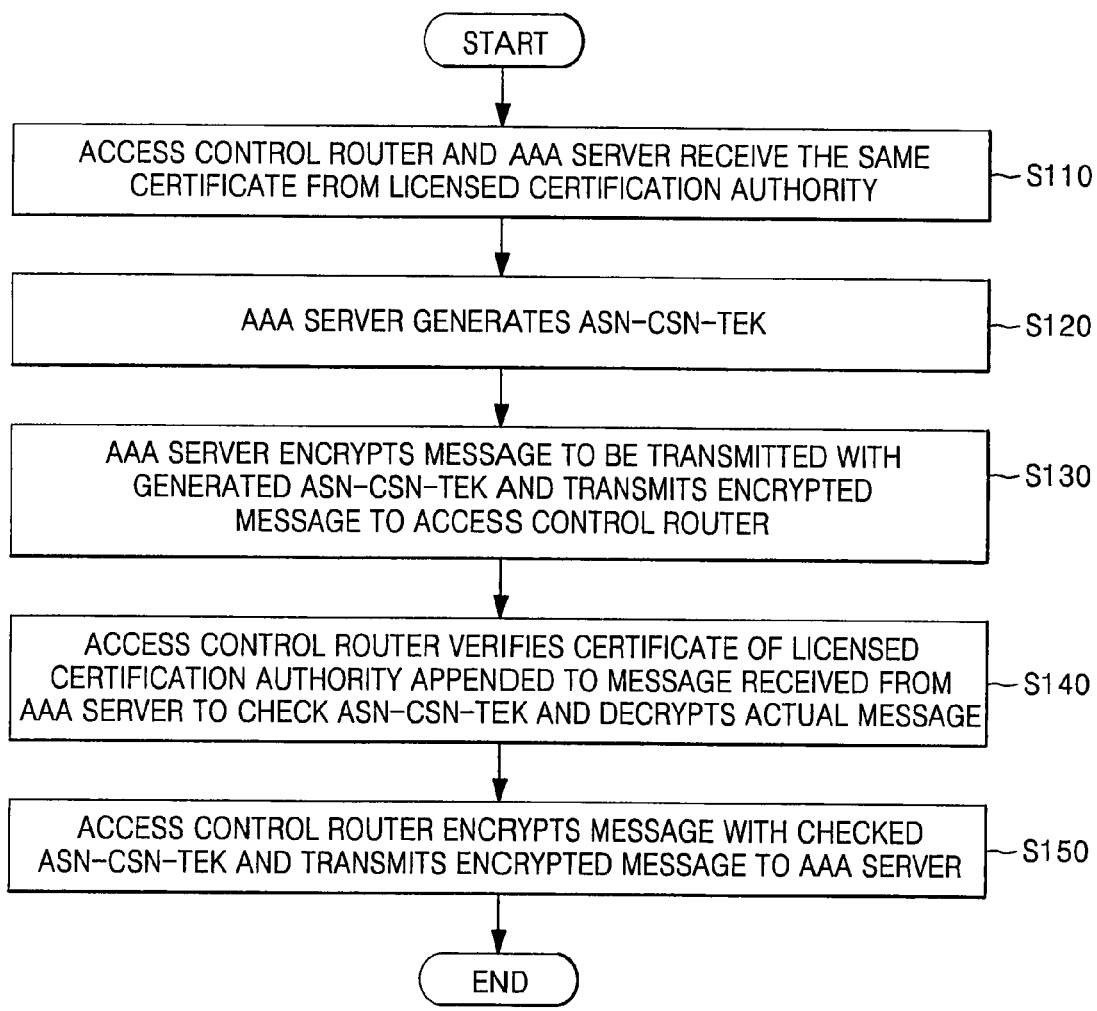
FIG. 8 is a flowchart illustrating a method for providing security between an access control router and an Authentication, Authorization, and Accounting (AAA) server in a Microwave Access (WiMAX) network system according to a fourth exemplary embodiment of the principles of the present invention.

A method for providing security in the mobile Microwave Access (WiMAX) network system having the above configuration according to a fourth exemplary embodiment of the present invention will now be described with reference to FIG. 8.

The access control router 30 and Authentication, Authorization, and Accounting (AAA) server 40 receive the same certificate from licensed certification authority 50 (S110).

The Authentication, Authorization, and Accounting (AAA) server 40 then generates an asn-csn-Traffic Encryption Key (TEK) (S120).

The Authentication, Authorization, and Accounting (AAA) server 40 then encrypts a message to be transmitted with the generated Access Service Network Connectivity Service Network Traffic Encryption Key (asn-csn-TEK), and transmits the encrypted message to access control router 30 (S130).

The access control router 30 then verifies the certificate of licensed certification authority 50 appended to the message received from Authentication, Authorization, and Accounting (AAA) server 40 to check the Access Service Network Connectivity Service Network Traffic Encryption Key (asn-csn-TEK), and decrypts the message received from Authentication, Authorization, and Accounting (AAA) server 40 to obtain an actual message (S140).

The access control router 30 then encrypts the actual message with the verified Access Service Network Connectivity Service Network Traffic Encryption Key (asn-csn-TEK) and transmits the encrypted message to Authentication, Authorization, and Accounting (AAA) server 40 (S150).

The Access Service Network Connectivity Service Network Traffic Encryption Key (asn-csn-TEK) generated by Authentication, Authorization, and Accounting (AAA) server 40 includes a timestamp. The Access Service Network Connectivity Service Network Traffic Encryption Key (asn-csn-TEK) is encrypted with a public key and may include the certificate from the licensed certification authority and the timestamp.

With the system and method for providing security in the mobile Microwave Access (WiMAX) network system according to the present invention, security vulnerability of access network communication in the mobile Microwave Access (WiMAX) network system can be eliminated. That is, message exposure in communication sections other than the section between the mobile station and the radio access station in the mobile Microwave Access (WiMAX) network system can be prevented. In addition, message security in the Access Service Network (ASN) and message confidentiality between the Access Service Network (ASN) and the Connectivity Service Network (CSN) can be provided by applying a public key infrastructure (PKI)-based electronic authentication system.

While the present invention has been described with reference to exemplary embodiments thereof, it will be understood by those skilled in the art that various changes in form and detail may be made therein without departing from the scope of the present invention as defined by the following claims.

What is claimed is:

1. An encryption system in a mobile Worldwide Interoperability for Microwave Access (WiMAX) network system, the mobile Microwave Access (WiMAX) network system comprising:
 a radio access station in wireless Internet communication with a mobile station;
 an access control router in Internet Protocol (IP) network communication with the radio access station;
 an Authentication, Authorization, and Accounting (AAA) server;
 a home agent; and
 the encryption system, the encryption system comprising:
  a first encryption module associated with at least the radio access station, the first encryption module to:
   store a certificate provided by a licensed certification authority,
   encrypt a traffic encryption key and a message generated by the first encryption module with the stored certificate as a traffic encryption key message,
   transmit the traffic encryption key message encrypted with the certificate to a destination,
   decrypt, if a message encrypted with a traffic encryption key is received, the received message with the traffic encryption key generated by the first encryption module, and
   process the decrypted received message; and
  a second encryption module associated with at least the access control router, the second encryption module to:
   decrypt, if the traffic encryption key message encrypted with the certificate is received from the first encryption module, the received traffic encryption key message with the certificate provided by the licensed certification authority to detect the traffic encryption key,
   encrypt a message with the detected traffic encryption key, and
   transmit the message encrypted with the detected traffic encryption key.

2. The encryption system of claim 1, wherein the first encryption module comprises:
 a certificate storage unit to store the certificate provided by the licensed certification authority;
 an encryption key generator to generate the traffic encryption key;
 an authentication message generator to:
  encrypt the traffic encryption key generated by the encryption key generator and the message generated by the first encryption module with the certificate provided by the licensed certification authority as the traffic encryption key message, and
  transmit the traffic encryption key message encrypted with the certificate to the access control router; and
 a message authentication processor to decrypt, if the message encrypted with the traffic encryption key is received, the received message with the traffic encryption key generated by the encryption key generator to effectuate authentication.

3. The encryption system of claim 2, wherein the second encryption module comprises:
 a certificate storage unit to store the certificate provided by the licensed certification authority;
 a certificate decryptor to detect, if the traffic encryption key message encrypted with the certificate is received, the traffic encryption key based on the certificate stored in the certificate storage unit, the traffic encryption key being authenticated and received together with the message; and
 a message encryptor to encrypt the message with the traffic encryption key detected by the certificate decryptor and transmit the message encrypted with the traffic encryption key.

4. The encryption system of claim 3, wherein respective ones of the first encryption module and the second encryption module are disposed in each of the radio access station, the access control router, and the Authentication, Authorization, and Accounting (AAA) server of the mobile Microwave Access (WiMAX) network system.

5. The encryption system of claim 1, wherein the traffic encryption key message encrypted with the certificate comprises timestamp information.

6. A method to provide security between a radio access station and an access control router in a mobile Worldwide Interoperability for Microwave Access (WiMAX) network system, the method comprising:
 receiving, by the radio access station and the access control router, the same certificate from a licensed certification authority;
 generating, by the radio access station, an Access Service Network Traffic Encryption Key (asn_TEK);
 encrypting, by the radio access station, a message to be transmitted with the generated Access Service Network Traffic Encryption Key (asn_TEK);
 transmitting, by the radio access station, the encrypted message to the access control router, the certificate being appended to the encrypted message;
 verifying, by the access control router, the certificate appended to the encrypted message received from the radio access station to determine the Access Service Network Traffic Encryption Key (asn_TEK);
 decrypting, by the access control router, the encrypted message to obtain an actual message;
 encrypting, by the access control router, the actual message with the determined Access Service Network Traffic Encryption Key (asn_TEK); and
 transmitting, by the access control router, the encrypted message to the radio access station.

7. The method of claim 6, wherein the Access Service Network Traffic Encryption Key (asn_TEK) comprises timestamp information.

8. The method of claim 6, wherein the Access Service Network Traffic Encryption Key (asn_TEK) is encrypted with a public key, and wherein the Access Service Network Encryption Key (Asn_TEK) comprises: the certificate of the licensed certification authority and timestamp information.

* * * * *